Aug. 18, 1925.
P. DAIMLER
1,550,429
CHANGE SPEED MECHANISM
Original Filed May 27, 1919
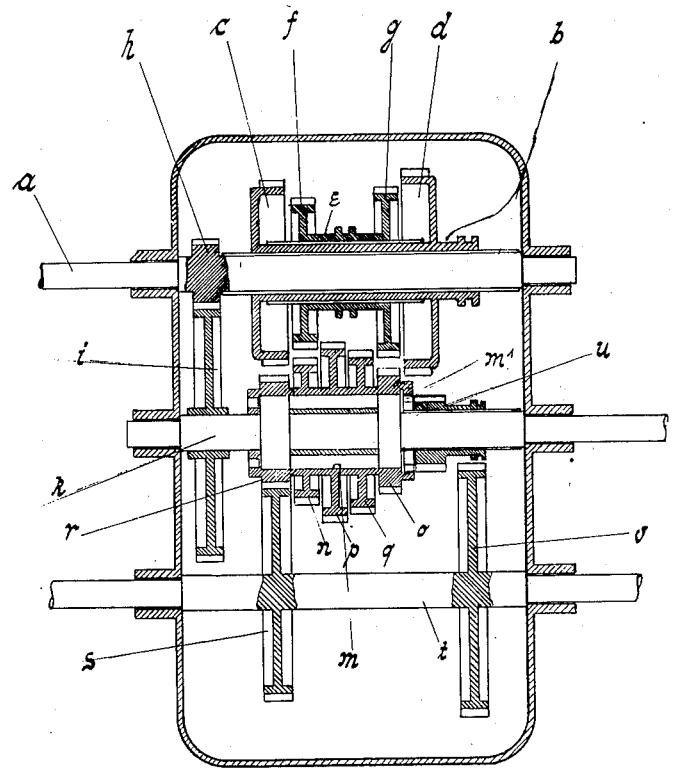
Inventor:
Paul Daimler Patented Aug. 18, 1925.

1,550,429

UNITED STATES PATENT OFFICE.

PAUL DAIMLER, OF CANNSTATT, GERMANY, ASSIGNOR TO DAIMLER-MOTOREN-GE-SELLSCHAFT, OF UNTERTURKHEIM, GERMANY, A CORPORATION OF GERMANY.

CHANGE-SPEED MECHANISM.

Application filed May 27, 1919, Serial No. 300,225. Renewed December 5, 1924.

(GRANTED UNDER THE PROVISIONS OF THE ACT OF MARCH 3, 1921, 41 STAT. L., 1313.)

*To all whom it may concern:*

Be it known that I, PAUL DAIMLER, a citizen of Germany, residing at Cannstatt, Wurttemberg, Germany, have invented certain new and useful Improvements in a Change-Speed Mechanism (for which I have filed an application in Germany, May 13, 1918, Patent Number 330,321), of which the following is a specification.

In change speed mechanisms of the usual type such as are used for motor vehicles a single countershaft is provided for all speed adjustments.

In mechanisms for six or more speeds and high gear ratios it would not be practicable to employ one countershaft only because the distance between the shafts would become too great in consequence of the high gear ratios and because the toothed wheels could not receive practicable dimensions.

In order to keep the entire mechanism as short as possible the slidable change wheels on the first counter shaft are arranged in such a manner that, when out of mesh, the smaller change wheels are opposite the smaller wheels on the second counter shaft. The larger change wheels on the first countershaft are cup-shaped and, when thrown into mesh, overlap the smaller wheels of the same shaft.

On the accompanying drawing my invention is shown by way of an example.

Slidably mounted on the drive shaft $a$ is a sleeve shaft $b$ carrying gears $c$ and $d$ integral therewith and a hollow shaft $e$ on which are rigidly mounted gears $f$ and $g$, said hollow shaft $e$ being slidably carried on the sleeve shaft $b$. The first shaft $a$ drives the counter shaft $k$ through the wheels $h$ and $i$. On the counter shaft is rotatably mounted a sleeve $m$ with wheels $n$, $o$, $p$ and $q$. This sleeve also carries a wheel $r$ which drives through another wheel $s$ the shaft $t$. The sleeve $m$ is provided with a coupling $m^1$ which can be brought into mesh with a wheel $u$ which is slidable on the counter shaft $k$ in order to couple the sleeve $m$ with the counter shaft $k$. Moreover, the wheel $u$ can, by shifting it along the counter shaft $k$, be thrown into mesh with a wheel $v$ mounted on the shaft $t$.

In order to throw in the lowest speed the change wheel $u$ on the shaft $k$ will be brought into mesh with the wheel $v$ of the shaft $t$. The power is then transmitted from the main driving shaft $a$ through the wheels $h$, $i$, the counter shaft $k$ and the wheels $u$, $v$, to the shaft $t$.

To throw in the second speed the change wheel $u$ will be brought into mesh with the teeth $m^1$ of the sleeve $m$. The power is then transmitted from the shaft $a$ through the wheels $h$, $i$, the countershaft $k$, the coupling $u$, $m^1$ and the wheels $r$, $s$, to the shaft $t$.

In order to throw in the third, fourth, fifth and sixth speed the change wheels $b$, $g$, $c$ and $d$ are successively brought into mesh with the wheels $p$, $q$, $n$, $o$.

The power is then transmitted from the driving shaft $a$ through the counter shaft $b$ and the toothed wheels $c$, $d$, $f$, $g$ and $n$, $o$, $p$, $q$ respectively, the sleeve $m$ and the wheels $r$, $s$ to the shaft $t$.

As can be seen from the drawing the wheels $r$, $s$ are located approximately in the plane of the change wheel $c$, when the latter is out of mesh which obviates the necessity of making the gear box larger.

Although six different speeds are provided the shafts of the mechanism only have a very short length compared with the usual types of change speed mechanisms. This is rendered possible by the special arrangement of the change wheels $c$, $d$, $f$, $g$ on the shaft $a$.

As can be seen from the drawing the smaller change wheels $f$ and $g$, when out of mesh, are opposite the smaller wheels $n$ and $o$. The wheels $n$, $o$, $p$, $q$ can be arranged on the sleeve quite close together because it is not necessary to leave a space between them for shifting the change wheels, as the displacement of the change wheels is rendered possible by making the larger outside change wheels $c$, $d$ cup shaped and by using their common hub as a key shaft for the common hub of the smaller change wheels $f$ and $g$. When the change wheels $c$ and $d$ are thrown into mesh they overlap the change wheels $f$ and $g$ which lie then in the cavities of the larger wheels. A change speed mechanism of the new type referred to can be provided in a suitable way with a reversing gear.

Having thus described my invention what I claim is:

1. A change speed mechanism comprising in combination, a drive shaft, a sleeve shaft on said drive shaft, a counter shaft, a sleeve on said counter shaft, low speed gears connecting said drive and counter shafts, high speed gears adapted to connect said sleeves, a driven shaft and means for driving said driven shaft from the sleeve on said counter shaft.

2. A change speed mechanism comprising in combination a drive shaft, a sleeve shaft on said drive shaft, a counter shaft, a sleeve on said counter shaft, a driven shaft, low speed gearing connecting said drive, counter and driven shafts, high speed gearing adapted to connect said sleeves and means for driving said driven shaft from the sleeve on said counter shaft.

3. In a change speed mechanism provided with a main shaft, a sleeve shaft slidable thereon and a hollow shaft slidable on said sleeve shaft, the combination of cup shaped change speed wheels on said sleeve shaft and of smaller change speed wheels on said hollow shaft, said cup shaped wheels, when all said wheels are out of mesh, lying opposite the smaller change speed wheels of the hollow shaft and adapted to overlap and enclose said smaller wheels when either said sleeve or said hollow shaft is shifted.

4. A change-speed gear, comprising in combination a main driving shaft, a driven shaft, a plurality of counter-shafts, a plurality of hollow shafts mounted upon said driving shaft and one of said counter-shafts, gears upon said driven shaft, a plurality of gears upon said hollow shafts arranged to be selectively engaged with each other to transmit motion from said drive shaft to said driven shaft in different ratios and other gears mounted directly on said counter-shafts to still further vary the driven speed of said driven shaft.

5. A change-speed gear comprising in combination, a main driving shaft, a driven shaft, gearing connected with said driven shaft, a sleeve shaft slidably mounted upon said driving shaft, a pair of recessed gears carried by said sleeve shaft to rotate therewith and arranged to be selectively shifted by said sleeve shaft lengthwise of said driving shaft and selectively engaged with said gearing and a pair of gears slidably mounted upon said sleeve shaft to rotate therewith and arranged to be selectively shifted lengthwise of said sleeve shaft and selectively engaged with said gearing, said recessed gears being arranged to overlap and enclose one or the other of said last named pair of gears during certain selective adjustments of the gears.

6. A change speed mechanism comprising in combination a main driving shaft, a driven shaft, gearing on said driven shaft, a sleeve shaft slidable on said driving shaft, a hollow shaft slidably mounted on said sleeve shaft and a gear on each of said last named shafts arranged to be operatively connected with said gearing on the driven shaft, one of said gears being recessed and arranged to overlap and enclose the other gear during the selective adjustment of said gears.

7. A change speed gearing comprising in combination a main driving shaft, a sleeve shaft slidably mounted thereon, a counter shaft, large cup shaped gears carried by said sleeve shaft, smaller gears on said counter shaft arranged for connection with said cup shaped gears, additional gears on said counter shaft, small gears slidably mounted on said sleeve shaft and arranged to be meshed with said additional gears and when out of mesh therewith lying opposite the smaller gears on said counter shaft, said large cup shaped gears, when in mesh with said smaller gears of said counter shaft overlapping the smaller gears of said sleeve shaft, a driven shaft and means for transmitting motion from said counter shaft to said driven shaft.

8. A change speed mechanism comprising in combination a main drive shaft, a sleeve on said drive shaft, a counter shaft, a sleeve loose on said counter shaft, low speed gearing connecting said drive and counter shafts, a coupling adapted to operatively connect the counter shaft with the sleeve thereon, high speed gearing adapted to connect said sleeves, a driven shaft and means for driving said driven shaft from the sleeve on said counter shaft.

In testimony whereof I have signed my name.

PAUL DAIMLER.